United States Patent
Sridhar et al.

(10) Patent No.: US 11,479,307 B2
(45) Date of Patent: Oct. 25, 2022

(54) PIVOT BRACKET DEBRIS MITIGATION COVER

(71) Applicants: Vinaya Sridhar, Auburn Hills, MI (US); Robert J Gibbs, Novi, MI (US); Christopher J Duke, White Lake, MI (US)

(72) Inventors: Vinaya Sridhar, Auburn Hills, MI (US); Robert J Gibbs, Novi, MI (US); Christopher J Duke, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 226 days.

(21) Appl. No.: 17/030,661

(22) Filed: Sep. 24, 2020

(65) Prior Publication Data
US 2022/0089227 A1 Mar. 24, 2022

(51) Int. Cl.
*B62D 33/027* (2006.01)
*B62D 33/077* (2006.01)

(52) U.S. Cl.
CPC ....... *B62D 33/077* (2013.01); *B62D 33/0273* (2013.01)

(58) Field of Classification Search
CPC .............. B62D 33/027; B62D 33/023; B62D 33/0273; B62D 33/03; E05Y 2900/544; E05Y 2900/546
See application file for complete search history.

(56) References Cited

U.S. PATENT DOCUMENTS

| | | | |
|---|---|---|---|
| 8,740,279 B1* | 6/2014 | McGoff | B62D 33/0273 49/168 |
| 10,288,173 B2 | 5/2019 | Chapagain et al. | |
| 10,288,174 B2 | 5/2019 | Chapagain et al. | |
| 2007/0132264 A1* | 6/2007 | Koneval | B62D 33/0273 296/57.1 |
| 2009/0302630 A1* | 12/2009 | Duffy | E05F 1/123 296/57.1 |
| 2013/0278004 A1* | 10/2013 | Sackett | B62D 33/0273 296/57.1 |
| 2017/0183903 A1* | 6/2017 | Schwendemann | E05D 11/00 |
| 2017/0274869 A1* | 9/2017 | Da Deppo | B60R 25/00 |
| 2020/0399943 A1* | 12/2020 | Ulewicz | B62D 33/0273 |
| 2021/0237808 A1* | 8/2021 | Ghoukasian | B62D 33/037 |
| 2021/0245817 A1* | 8/2021 | Gibbs | B62D 33/0276 |
| 2021/0245818 A1* | 8/2021 | Van Norman | B62D 33/0273 |
| 2021/0371017 A1* | 12/2021 | Heins | B62D 33/0273 |
| 2022/0063735 A1* | 3/2022 | Dzurnak | B62D 33/0273 |

(Continued)

*Primary Examiner* — Gregory A Blankenship
(74) *Attorney, Agent, or Firm* — Ralph E. Smith (57) ABSTRACT

A pivot bracket assembly having a pivot bracket configured to be fixed between a tailgate and a vehicle body. A pivot pin extends through the through-hole of the pivot bracket, and includes a first end configured to be attached to the tailgate and a second end. A pivot arm includes an aperture configured for receipt of the second end of the pivot pin, and a portion configured to be coupled to the vehicle body. A bushing assembly including a sleeve and at least one bushing positioned within the sleeve is positioned within the through-hole of the pivot bracket and the pivot pin extends through the sleeve and the bushing, wherein a debris mitigation cover is positioned between the pivot arm and the pivot bracket that is configured to minimize dust and/or debris from entering the bushing assembly.

18 Claims, 5 Drawing Sheets

(56) References Cited

U.S. PATENT DOCUMENTS

| | | | |
|---|---|---|---|
| 2022/0089227 A1* | 3/2022 | Sridhar | B62D 33/077 |
| 2022/0161870 A1* | 5/2022 | Horner | B60Q 1/307 |
| 2022/0194490 A1* | 6/2022 | Wilson | B62D 33/0273 |

* cited by examiner

PIVOT BRACKET DEBRIS MITIGATION COVER

FIELD

The present disclosure relates to a vehicle having a pivot bracket debris mitigation cover.

BACKGROUND

This selection provides background information related to the present disclosure and is not necessarily prior art.

It is common for vehicles to include an area such as a cargo bed, where it is desirable for the cargo bed to be closed in some situations, but open at other times in order to provide access to the cargo bed. A closure, such as a door or tailgate, affixed to the vehicle has often been used to both block the cargo bed at some times, and to provide access to it at others. In some instances, it has been found to be advantageous to provide a multi-functional tailgate which includes two doors, each capable of being pivoted about a horizontal axis and a vertical axis.

Multifunctional tailgate systems, however, are frequently heavier than traditional tailgate systems, which places additional stress on a pivot bracket that enables the tailgate to rotate about the horizontal axis. In this regard, the additional weight of the multifunctional tailgate can cause the pivot pin to become slightly skewed away from the horizontal pivot axis of the tailgate, which can in turn impart a force on a bushing or bearing that surrounds the pivot pin to an extent that may allow dust and/or debris to enter between the bushing and the pivot pin, which can degrade the bushing and/or pivot pin over time, which is undesirable.

SUMMARY

According to one aspect of the present disclosure, the present disclosure provides a pivot bracket assembly that pivotably couples a tailgate to a vehicle body. The pivot bracket assembly includes a pivot bracket configured to be fixed between the tailgate and the vehicle body and includes a through-hole. A pivot pin extends through the through-hole of the pivot bracket and includes a first end configured to be attached to the tailgate and a second end. A pivot arm includes an aperture configured for receipt of the second end of the pivot pin, and a portion configured to be coupled to the vehicle body. A bushing assembly includes a sleeve and at least one bushing positioned within the sleeve, wherein the sleeve is positioned within the through-hole of the pivot bracket and the pivot pin extends through the sleeve and the bushing. A debris mitigation cover is positioned between the pivot arm and the pivot bracket that is configured to minimize dust and/or debris from entering the bushing assembly.

According to the first aspect of the present disclosure, the debris mitigation cover includes an exterior piece and an interior piece coupled to the exterior piece, wherein the interior piece is positioned between the pivot arm and the pivot bracket and the exterior piece covers the aperture of the pivot arm configured for receipt of the second end of the pivot pin.

According to the first aspect of the present disclosure, at least one of the exterior piece and the interior piece includes a plurality of recesses and the other of the exterior piece and the interior pieces includes a plurality of tabs configured for receipt within the plurality of recesses to couple the exterior piece and the interior piece together.

According to the first aspect of the present disclosure, the exterior piece and the interior piece sandwich the pivot arm.

According to the first aspect of the present disclosure, the interior piece includes an aperture configured for receipt of the bushing assembly and the pivot pin.

According to the first aspect of the present disclosure, the exterior piece covers the aperture of the pivot arm that is configured for receipt of the second end of the pivot pin to prevent entrance of dust and/or debris between the second end of the pivot pin and the aperture of the pivot arm.

According to the first aspect of the present disclosure, the interior piece and the exterior piece each include a body having a neck that is configured to extend along at least a portion of the pivot arm on opposing sides of the pivot arm.

According to the first aspect of the present disclosure, the sleeve includes a pair of collars extending radially outward, and the pivot bracket is positioned between the pair of collars.

According to a second aspect of the present disclosure, there is provided a tailgate for a vehicle that is configured to pivot between horizontally open and closed positions, wherein the tailgate is pivotably attached to the vehicle by a pivot bracket assembly. The pivot bracket assembly includes a pivot bracket that is configured to be fixed between the tailgate and a body of the vehicle, and includes a through-hole. A pivot pin extends through the through-hole of the pivot bracket and includes a first end that is configured to be attached to the tailgate and a second end. A pivot arm includes an aperture that is configured for receipt of the second end of the pivot pin, and a portion configured to be coupled to the body of the vehicle. A bushing assembly includes a sleeve and at least one bushing positioned within the sleeve. The sleeve is positioned within the through-hole of the pivot bracket and the pivot pin extends through the sleeve and the bushing. A debris mitigation cover is positioned between the pivot arm and the pivot bracket that is configured to minimize dust and/or debris from entering the bushing assembly.

According to the second aspect of the present disclosure, the debris mitigation cover includes an exterior piece and an interior piece coupled to the exterior piece, wherein the interior piece is positioned between the pivot arm and the pivot bracket and the exterior piece covers the aperture of the pivot arm configured for receipt of the second end of the pivot pin.

According to the second aspect of the present disclosure, at least one of the exterior piece and the interior piece includes a plurality of recesses and the other of the exterior piece and the interior pieces includes a plurality of tabs configured for receipt within the plurality of recesses.

According to the second aspect of the present disclosure, the exterior piece and the interior piece sandwich the pivot arm.

According to the second aspect of the present disclosure, the interior piece includes an aperture configured for receipt of the bushing assembly and the pivot pin.

According to the second aspect of the present disclosure, the exterior piece covers the aperture of the pivot arm that is configured for receipt of the second end of the pivot pin to prevent entrance of dust and/or debris between the second end of the pivot pin and the aperture of the pivot arm.

According to the second aspect of the present disclosure, the interior piece and the exterior piece each include a body having a neck that is configured to extend along at least a portion of the pivot arm on opposing sides of the pivot arm.

According to the second aspect of the present disclosure, the sleeve includes a pair of collars extending radially outward, and the pivot bracket is positioned between the pair of collars.

Further areas of applicability will become apparent from the description provided herein. The description and specific examples in this summary are intended for purposes of illustration only and are not intended to limit the scope of the present disclosure.

DETAILED DESCRIPTION

Example embodiments will now be described more fully with reference to the accompanying drawings.

Figure 1:
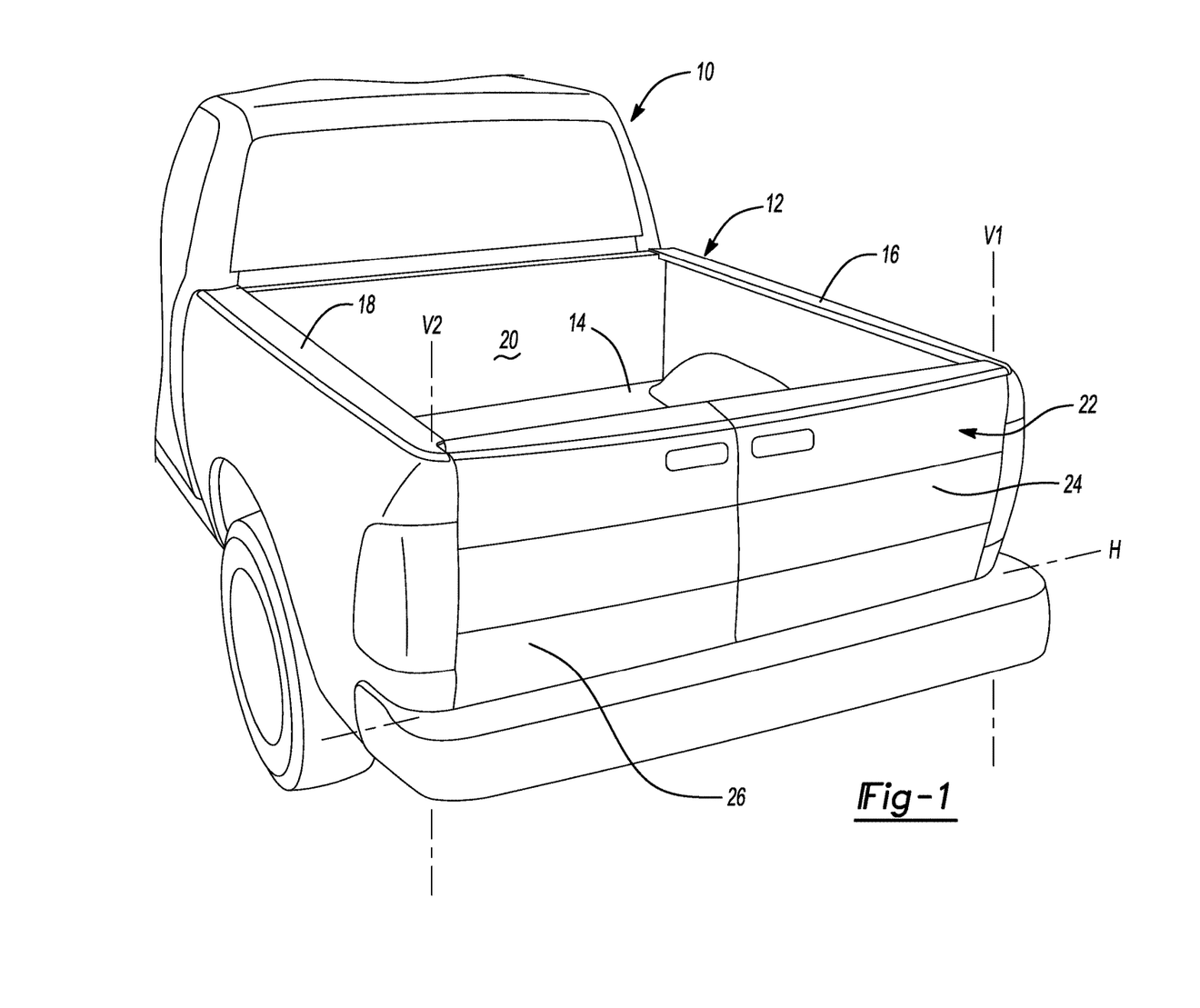
FIG. 1 is a partial perspective view of a vehicle having a vehicle body and a tailgate.

With reference to FIG. 1, a vehicle 10 is provided. Vehicle 10 may be a pickup truck including cargo bed 12, which includes a floor deck 14, a pair of sidewalls 16 and 18, and a front wall panel 20. Cargo bed 12 also includes a rear or aft opening that is configured for receipt of a multi-function tailgate 22. In the illustrated embodiment tailgate 22 includes a pair of doors 24 and 26. Tailgate 22 is pivotally coupled to the cargo bed 12 so that tailgate 22 is allowed to pivot about a horizontal axis H between a horizontal open position and a closed position. Doors 24 and 26 may be latched together so as to pivot together about horizontal axis H, or doors 24 and 26 may be unlatched so as to pivot independently of each other about horizontal axis H. When doors 24 and 26 are unlatched, each door 24, 26 can also rotate independently about a respective vertical axis V1, V2 between a vertical open position and the closed position.

Figure 2:
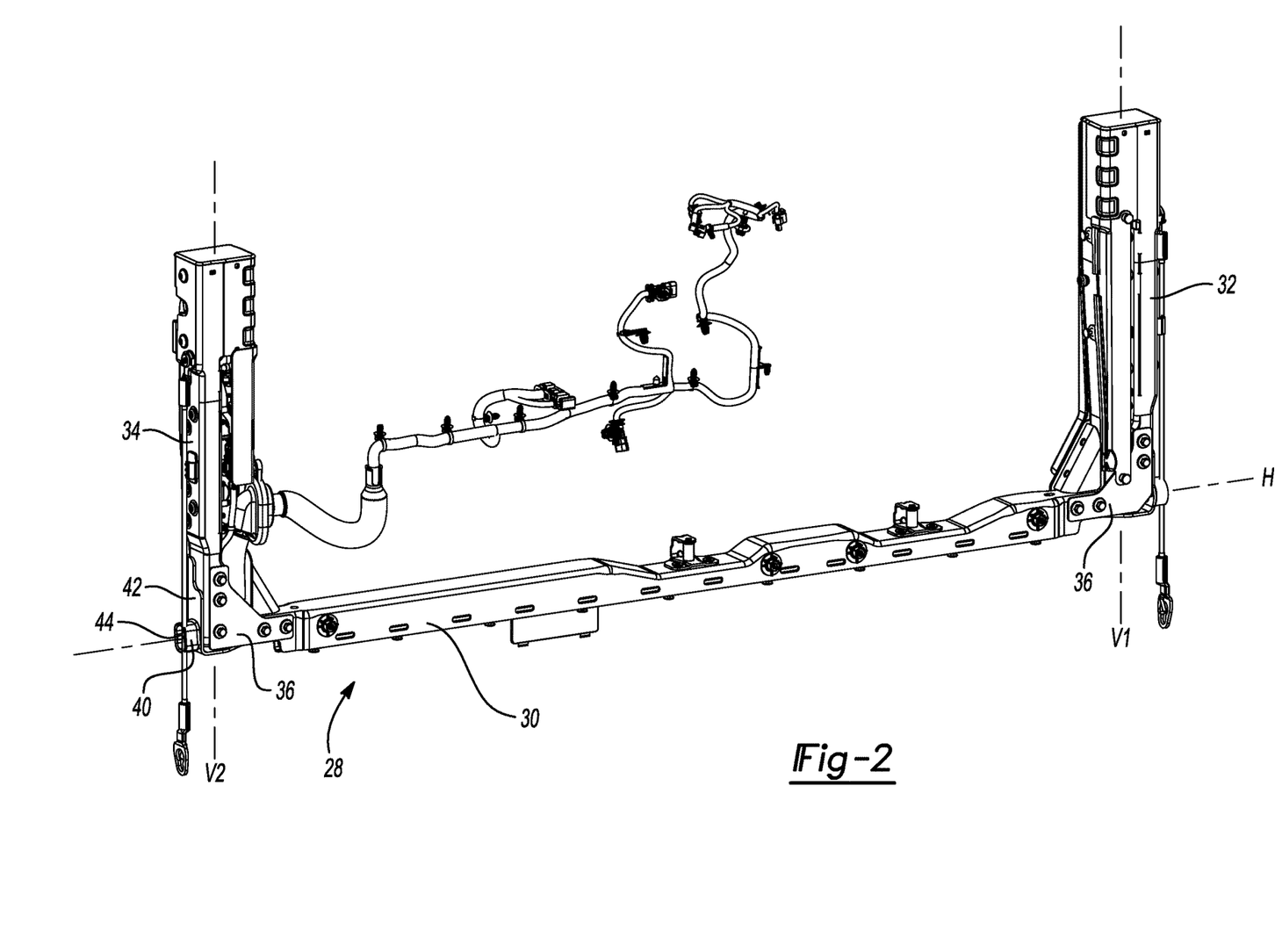
FIG. 2 is a perspective view of a door frame of the tailgate illustrated in FIG. 1.

FIG. 2 illustrates a door frame 28 of tailgate 22 that enables doors 24 and 26 to rotate about horizontal axis H and vertical axes V1 and V2. Door frame 28 includes a cross beam 30 and a pair of side beams 32, 34. Cross beam 30 extends about floor deck 14 between sidewalls 16 and 18, and is rotatable about horizontal axis H as will be described in more detail later. Side beams 32 and 34 each extend orthogonally relative to cross beam 30, and are connected to cross beam 30 by L-shaped brackets 36. Doors 24 and 26 are connected to side beams 32 and 34, respectively, in a manner such that door 24 may pivot about vertical axis V1 and door 26 may pivot about vertical axis V2.

Figure 3:
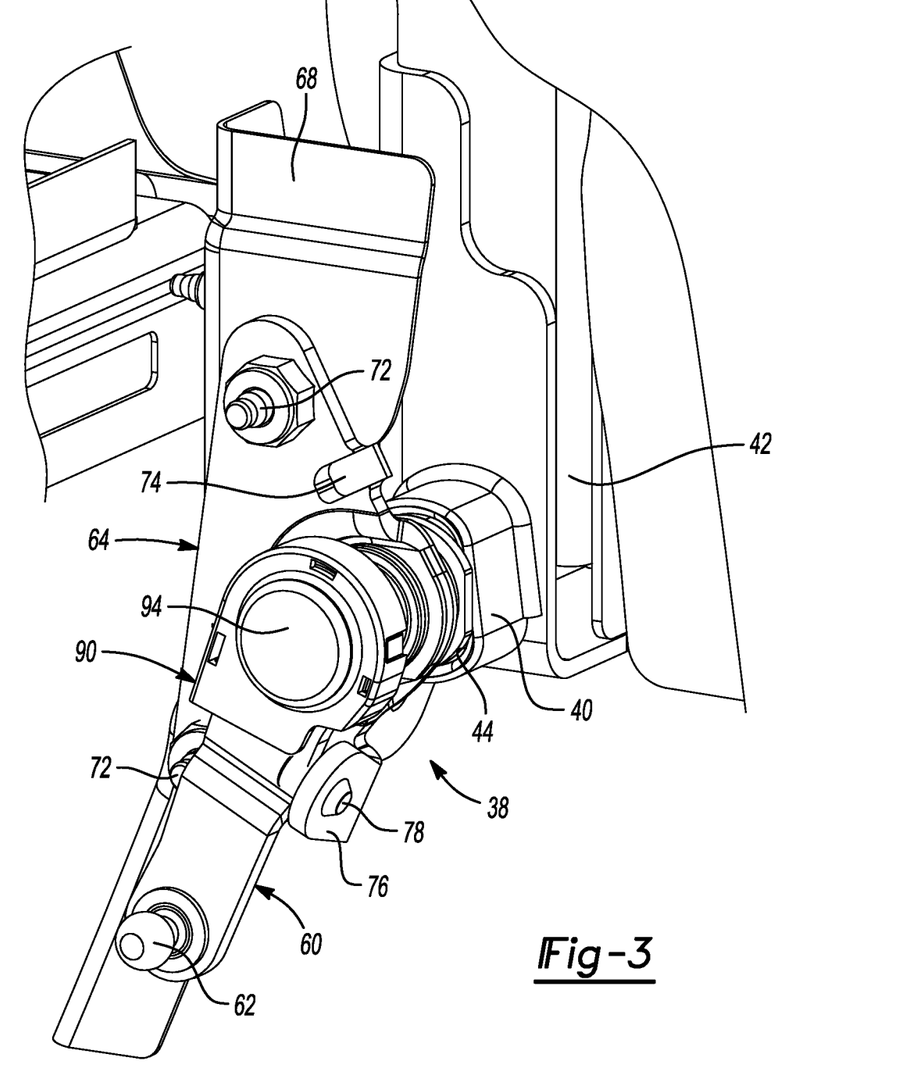
FIG. 3 is a perspective view of a pivot bracket assembly according to a principle of the present disclosure.
Figure 4:
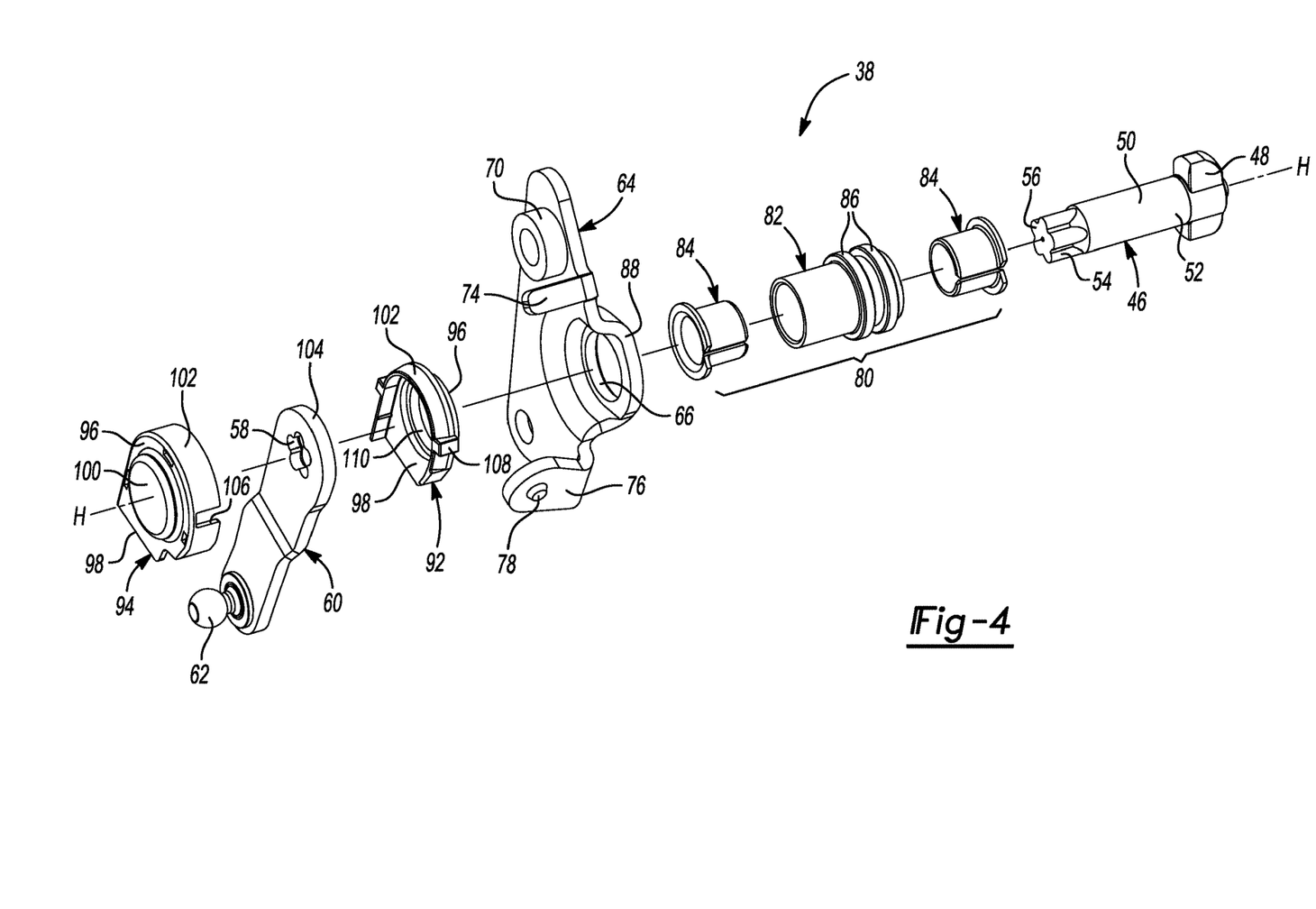
FIG. 4 is an exploded view of the pivot bracket assembly illustrated in FIG. 3.

As best shown in FIG. 3, door frame 28 is pivotable about horizontal axis H and connected to sidewall 18 by a pivot bracket assembly 38. Side beam 34 includes a boss 40 that extends outward from a proximal portion 42 thereof. Boss 40 includes a recess 44 configured for receipt of pivot bracket assembly 38. As best shown in FIG. 4, pivot bracket assembly 38 includes a pivot pin 46. Pivot pin 46 includes a head 48 that is shaped to correspond to a shape of recess 44, and a shaft 50 having a proximal end 52 connected to head 48 and a distal end 54. In the illustrated embodiment distal end 54 of shaft 50 has a star shape 56 that is designed to mate with a correspondingly shaped aperture 58 of a pivot arm 60 of pivot bracket assembly 38 that pivotably attaches pivot bracket assembly 38 to a frame (not shown) of vehicle 10. In this regard, pivot arm 60 includes a spherical protrusion 62 that mates with a spherical recess (not shown) formed in the frame that permit pivot arm 60 to pivot. Pivot pin 46 and pivot arm 60 may each be formed of a rigid material such as steel, or some other type of metal material.

A pivot bracket 64 is positioned between pivot pin 46 and pivot arm 60, and includes a through-hole 66 configured to permit pivot pin 46 to pass therethrough. Pivot bracket 64 is formed of the same or similar material to pivot pin 46 and pivot arm 60, and is fixed to a bracket 68 that is attached to sidewall 18 of cargo bed 12. Specifically, pivot bracket 64 includes a pair of bolt-receiving apertures 70 that attach pivot bracket 64 to bracket 68 by bolts 72. Pivot bracket 64 also includes a pair of outwardly extending lugs 74, 76. Lug 76 is configured as a stop that permits pivot arm 60 to pivot only a predetermined amount. In the illustrated embodiment, lug 76 includes a rubber or polymeric striker 78 to soften contact between pivot arm 60 and lug 76.

Pivot bracket assembly 38 includes a bushing assembly 80 that permits pivot pin 46 to rotate relative to pivot bracket 64. Bushing assembly 80 includes a sleeve 82 and a pair of bushings 84. Sleeve 82 and bushings 84 enable smooth rotation of pivot pin 46 relative to pivot bracket 64, and are also configured as a seal that prevents migration of dust and/or debris from entering between pivot bracket 64 and pivot pin 46 that can degrade smooth rotation of pivot pin 46 relative to pivot bracket 64 over time. Sleeve 82 is a substantially cylindrical member having a pair of radially outwardly extending collars 86. A distance between collars 86 is slightly greater than a thickness of pivot bracket 64, which permits an outer circumference 88 of through hole 66 to sit between collars 86. In this manner, sleeve 82 is reliably secured to pivot bracket 64. Sleeve 82 may be formed of a rubber or elastomeric material that allows for sleeve 82 to be manipulated such that collars 86 can sandwich outer circumference 88 of through-hole 66 of pivot bracket 64. Bushings 84 are preferably formed of a polymeric or plastic material that is more rigid in comparison to sleeve 82, which allow bushings 84 to act as a bearing surface for pivot pin 46.

While bushing assembly 80 is configured as a seal to prevent migration of dust and/or debris from entering between pivot bracket 64 and pivot pin 46, it should be understood that multi-functional tailgate 22 tends to be heavier in comparison to a conventional tailgate. This is a result of multi-function tailgate 22 having the additional mass of door frame 28, as well as a pair of doors 24 and 26 rather than a single door. Due to the increased weight of multi-function tailgate, additional stress is placed on pivot pin 46 at head 48 that can slightly skew pivot pin 46 relative to horizontal axis H. Due to this slight skew, bushings 84 may also become slightly skewed relative to horizontal axis H that can permit dust and/or debris to enter bushing assembly 80, which over time may cause bushings 84 to prematurely wear. In order to prevent dust and/or debris from entering bushing assembly 80, pivot bracket assembly 38 includes a debris mitigation cover 90.

Figure 5:
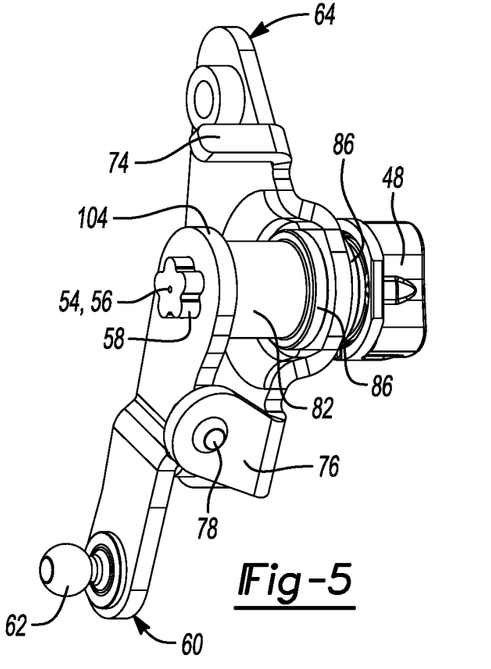
FIGS. 5 and 6 are perspective views of the pivot bracket assembly illustrated in FIG. 3 without a debris mitigation cover.
Figure 6:
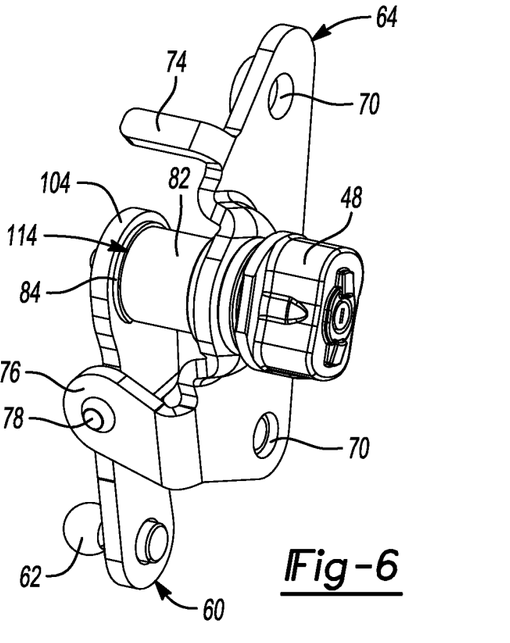
Figure 7:
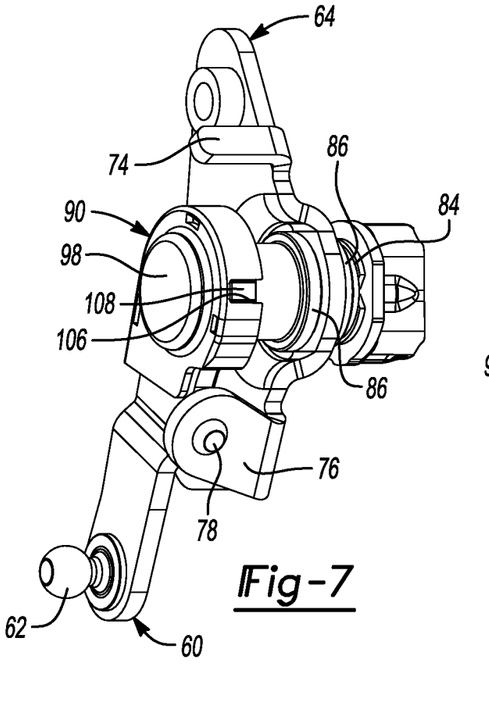
FIGS. 7 and 8 are perspective views of the pivot bracket assembly illustrated in FIG. 3 including the debris mitigation cover.
Figure 8:
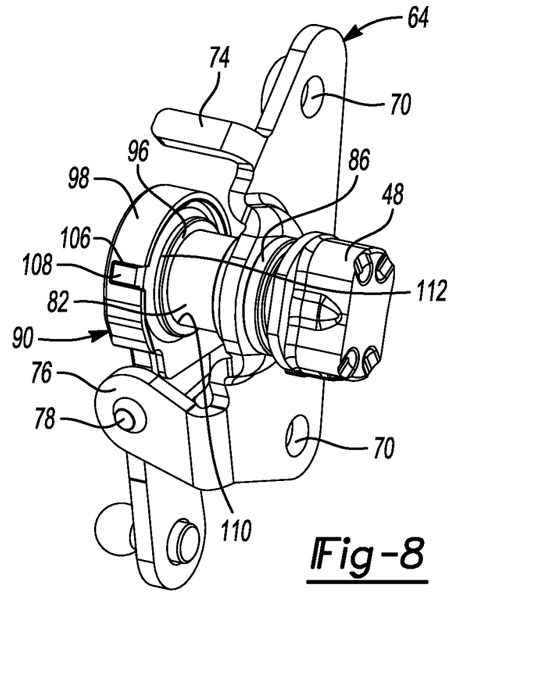

As best shown in FIG. 3 and FIGS. 5 to 8, debris mitigation cover 90 is a polymeric two-piece structure that includes an interior piece 92 and an exterior piece 94 that are mated together to sandwich the connection between pivot pin 46 and pivot arm 60. FIGS. 5 and 6 illustrate pivot bracket assembly 38 without debris mitigation cover 90, and FIGS. 7 and 8 illustrate pivot bracket assembly 38 with debris mitigation cover 90 to show how debris mitigation cover 90 prevents ingress of dust and/or debris into bushing assembly 80. Specifically, exterior piece 94 of debris mitigation cover 90 covers the connection between aperture 58 of pivot arm 60 and distal end 54 of pivot pin 46, and interior piece 92 seals the interface between pivot arm 60 and bushing assembly 80 such that no dust and/or debris can enter bushing assembly 80. Although debris mitigation cover 90 is preferably formed of a polymeric material such as polyamide (e.g., Nylon®), it should be understood that debris mitigation cover can also be formed of an elastomeric material or a metal material without departing from the scope of the present disclosure.

Interior piece 92 and exterior piece 94 each includes a body 96 having a neck 98 that is configured to extend along at least a portion of pivot arm 60. Exterior piece 94 includes a pocket 100 that is configured for receipt of pivot arm 60 and distal end 54 of pivot pin 46. Extending outward from bodies 96 of interior piece 92 and exterior piece 94 is a collar 102 that is configured to surround an outer surface 104 of pivot arm 60. Collar 102 of exterior piece 94 includes a plurality of recesses 106 formed therein that are designed to mate with correspondingly shaped tabs 108 of interior piece 92. Alternatively, interior piece 92 may include the recesses 106 and exterior piece 94 may include the plurality of tabs 108. Instead of pocket 100, interior piece 92 includes an aperture 110 configured for receipt of bearing assembly 80 and pivot pin 46. Aperture 110 is surrounded by an outwardly extending boss 112 that surrounds a terminal end 114 of bearing assembly 80. In this manner, dust and/or debris is prevented from entering bushing assembly 80, which ensures that bushings 84 will not be subjected to wear therefrom.

To assemble pivot bracket assembly 38, sleeve 82 is first inserted into through hole 66 of pivot bracket 64 such that outer circumference 88 of through-hole 66 is sandwiched by collars 86. Then, bushings 86 are inserted into opposing ends of sleeve 82, and pivot pin 46 is inserted into bushing assembly 80. Interior piece 92 is then mated with bushing assembly 80, and then pivot arm 60 is mated with distal end 54 of pivot pin 46. After pivot arm 60 is mated with pivot pin 46, exterior piece 94 is mated with interior piece 92 by mating recesses 106 with tabs 108 to complete assembly of pivot bracket assembly 38. Pivot bracket 64 can then be secured to bracket 68, and head 48 of pivot pin 46 can be mated with recess 44 boss 40.

What is claimed is:

1. A pivot bracket assembly that pivotably couples a tailgate to a vehicle body, the pivot bracket assembly comprising:
   a pivot bracket configured to be fixed between the tailgate and the vehicle body and including a through-hole;
   a pivot pin including a first end configured to be attached to the tailgate and a second end, the pivot pin extending through the through-hole of the pivot bracket;
   a pivot arm including an aperture configured for receipt of the second end of the pivot pin, and a portion configured to be coupled to the vehicle body;
   a bushing assembly including a sleeve and at least one bushing positioned within the sleeve, the sleeve being positioned within the through-hole of the pivot bracket and the pivot pin extending through the sleeve and the bushing; and
   a debris mitigation cover positioned between the pivot arm and the pivot bracket that is configured to minimize dust and/or debris from entering the bushing assembly.

2. The pivot bracket assembly according to claim 1, wherein the debris mitigation cover includes an exterior piece and an interior piece coupled to the exterior piece, the interior piece positioned between the pivot arm and the pivot bracket and the exterior piece covering the aperture of the pivot arm configured for receipt of the second end of the pivot pin.

3. The pivot bracket assembly according to claim 2, wherein at least one of the exterior piece and the interior piece includes a plurality of recesses and the other of the exterior piece and the interior pieces includes a plurality of tabs configured for receipt within the plurality of recesses to couple the exterior piece and the interior piece together.

4. The pivot bracket assembly according to claim 3, wherein the exterior piece includes the plurality of recesses and the interior piece includes the plurality of tabs.

5. The pivot bracket assembly according to claim 2, wherein the exterior piece and the interior piece sandwich the pivot arm.

6. The pivot bracket assembly according to claim 2, wherein the interior piece includes an aperture configured for receipt of the bushing assembly and the pivot pin.

7. The pivot bracket assembly according to claim 2, wherein the exterior piece covers the aperture of the pivot arm that is configured for receipt of the second end of the pivot pin to prevent entrance of dust and/or debris between the second end of the pivot pin and the aperture of the pivot arm.

8. The pivot bracket assembly according to claim 2, wherein the interior piece and the exterior piece each include a body having a neck that is configured to extend along at least a portion of the pivot arm on opposing sides of the pivot arm.

9. The pivot bracket assembly according to 1, wherein the sleeve includes a pair of collars extending radially outward, and the pivot bracket is positioned between the pair of collars.

10. A tailgate for a vehicle that is configured to pivot between horizontally open and closed positions, the tailgate being pivotably attached to the vehicle by a pivot bracket assembly comprising:
    a pivot bracket configured to be fixed between the tailgate and a body of the vehicle and including a through-hole;
    a pivot pin including a first end configured to be attached to the tailgate and a second end, the pivot pin extending through the through-hole of the pivot bracket;
    a pivot arm including an aperture configured for receipt of the second end of the pivot pin, and a portion configured to be coupled to the body of the vehicle;
    a bushing assembly including a sleeve and at least one bushing positioned within the sleeve, the sleeve being positioned within the through-hole of the pivot bracket and the pivot pin extending through the sleeve and the bushing; and
    a debris mitigation cover positioned between the pivot arm and the pivot bracket that is configured to minimize dust and/or debris from entering the bushing assembly.

11. The tailgate according to claim 10, wherein the debris mitigation cover includes an exterior piece and an interior piece coupled to the exterior piece, the interior piece positioned between the pivot arm and the pivot bracket and the exterior piece covering the aperture of the pivot arm configured for receipt of the second end of the pivot pin.

12. The tailgate according to claim 11, wherein at least one of the exterior piece and the interior piece includes a plurality of recesses and the other of the exterior piece and the interior pieces includes a plurality of tabs configured for receipt within the plurality of recesses to couple the exterior piece and the interior piece together.

13. The tailgate according to claim 12, wherein the exterior piece includes the plurality of recesses and the interior piece includes the plurality of tabs.

14. The tailgate according to claim 11, wherein the exterior piece and the interior piece sandwich the pivot arm.

15. The tailgate according to claim 11, wherein the interior piece includes an aperture configured for receipt of the bushing assembly and the pivot pin.

16. The tailgate according to claim 11, wherein the exterior piece covers the aperture of the pivot arm that is configured for receipt of the second end of the pivot pin to prevent entrance of dust and/or debris between the second end of the pivot pin and the aperture of the pivot arm.

17. The tailgate according to claim 11, wherein the interior piece and the exterior piece each include a body having a neck that is configured to extend along at least a portion of the pivot arm on opposing sides of the pivot arm.

18. The tailgate according to 10, wherein the sleeve includes a pair of collars extending radially outward, and the pivot bracket is positioned between the pair of collars.

* * * * *